United States Patent Office 3,388,155
Patented June 11, 1968

3,388,155
4,4-DIHALO-2-(4-BIPHENYLYL)-
3-BUTENOIC ACIDS
Robert M. Novack, Mendham, N.J., assignor to Warner-
Lambert Pharmaceutical Company, Morris Plains, N.J.,
a corporation of Delaware
No Drawing. Filed June 8, 1964, Ser. No. 373,520
2 Claims. (Cl. 260—515)

ABSTRACT OF THE DISCLOSURE

A novel process for the production of 4,4-dihalo-2-(4-biphenylyl)-3-butenoic acid by reacting 4,4,4-trihalo-crontonic acid with biphenyl in the presence of a Friedel-crafts catalyst.

This invention relates to a new and improved method for the preparation of 2-(4-biphenylyl)butyric acid. More particularly, the present invention relates to the preparation of 4,4-dihalo-2-(4-biphenylyl)-3-butenoic acids and to the resulting compounds so formed.

Generally, the present invention provides a method for the preparation of compounds which are useful in the preparation of therapeutics and having the following general formula:

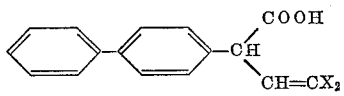

wherein X may be a halogen such as fluorine, chlorine, bromine and iodine. These compounds are found to be valuable intermediates in the preparation of 2-(4-biphenylyl)butyric acid by a process involving catalytic hydrogenation.

2-(4-biphenylyl)-butyric acid is the active ingredient for making the analgesic namol xenyrate, and it is used according to the disclosure set forth in U.S. Patent 3,181,994.

It is, therefore, an object of this invention to provide a new and valuable intermediate 4,4-dihalo-2-(4-biphenyl-yl)-3-butenoic acid.

It is also an object of this invention to provide a method for the preparation of 4,4,-dihalo-2-(4-biphenylyl)-3-butenoic aicd.

It is a further object of this invention to provide a method for the preparation of 2-(4-biphenylyl)butyric acid by hydrogenation of 4,4-dihalo-2-(4-biphenylyl)-3-butenoic acid.

Other objects and advantages will become more apparent from the folowing detailed description.

In the preparation of 2-(4-biphenylyl)butyric acid according to the present invention, 4,4-dihalo - 2-(4-biphenylyl)3-3butenoic acid may be prepared by reacting biphenyl with 4,4,4-trihalo-crotonic acid while in the presence of a suitable catalyst such as, for example, aluminum chloride, ferric chloride, stannic chloride, titanium tetrachloride, zinc chloride, zinc metal or the like. Zinc metal is desirably preferred for use in the process.

The catalysts which are usefully employed herein may be employed in amounts from about 0.5% by weight to about 75% by weight of the 4,4,4-trihalocrotonic acid and may be employed either separately or in any suitable combination. Although the catalyzed reaction is preferably conducted in a suitable solvent such as, for example, carbon disulfide, benzene, nitrobenzene, chlorobenzene and the like, it may also be conducted in the absence of such a solvent.

The reaction involving the catalyst appears to take place according to the following reaction scheme:

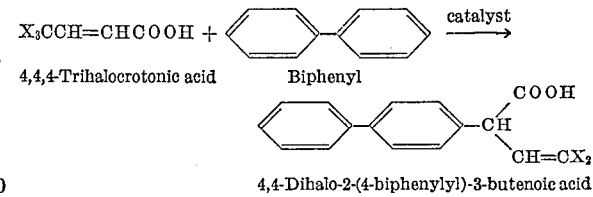

4,4-Dihalo-2-(4-biphenylyl)-3-butenoic acid wherein X is a halogen as previously described.

Although the above reaction may take place in the presence of equal molar amounts of reactants, it is desirable to include an excess of a reactant such as up to about 700 mole percent biphenyl as based on the total amount of trihalocrotonic acid employed. Preferably, as for example when aluminum chloride is employed as the reaction catalyst, an excess of about 300 to 600 mole percent of biphenyl is desirable when based upon the total amount of trihalocrotonic acid.

The catalytic reaction, previously described, is found to proceed at room temperature or slightly below as well as up to a temperature of about 150° C. Preferably, the reaction desirably takes place in a temperature range of from about 20° C. to about 70° C.

After the catalytic reaction has proceeded substantially to completion, the product is recovered and is found by analysis to be 4,4-dihalo-2-(4-biphenylyl)-3-butenoic acid which may be readily reduced to 2-(4-biphenylyl) butyric acid by reduction in the presence of suitable catalysts such as, for example, Raney nickel, platinum, palladium and the like. It is found desirable that these catalysts be maintained on suitable carriers such as, for example, charcoal, alumina or the like in amounts up to about 10% by weight of catalyst as based on the total amount of carrier.

The amount of catalyst usefully employed in the reaction is from about 0.1% by weight to about 15% by weight of the 4,4-dihalo-2-(4-biphenylyl)-3-butenoic acid initially employed in the hydrogenation reaction. Economical amounts of catalyst such as up to about 3% by weight are usually employed and are generally sufficient.

In the reduction reaction for the preparation of 2-(4-biphenylyl)butyric acid, 4,4-dihalo - 2-(4-biphenylyl)-3-butenoic acid is added to an aqueous alcoholic medium containing small amounts such as less than about 10% by weight of an alkali metal hydroxide.

The aqueous solution of the alcoholic composition may be formed by addition of water in amounts of about 1% by weight to about 20% by weight of the alcohol. Suitable alcoholic compositions for use herein include alkanol compounds such as, for example, methanol, ethanol, propanol and isopropanol. Preferably, the alkanol compound employed herein is methanol.

The alkali metal hydroxide usefully employed in the preparation of the alkali metal hydroxide aqueous alcohol solution include materials such as, for example, sodium hydroxide, potassium hydroxide, and the like which are desirably present in amounts from about 0.5 mole up to about 3 moles and preferably about 1 mole is employed as based on the amount of 4,4-dihalo-2-(4-biphenylyl)-3-butenoic acid which is present in the reaction medium.

The reduction reaction is found to take place according to the folowing reaction scheme:

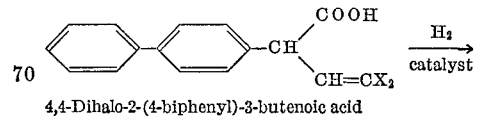

4,4-Dihalo-2-(4-biphenyl)-3-butenoic acid

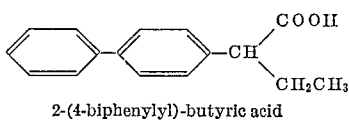

2-(4-biphenylyl)-butyric acid

The invention is more fully illustrated by the following examples.

Example 1

To a solution of 10 grams (.053 mole) of 4,4,4-trichlorocrotonic acid dissolved in 50 ml. of chlorobenzene is added a solution containing 10 grams (.053 mole) of titanium tetrachloride maintained in 10 ml. of chlorobenzene at a temperature of about 5° C. The solution of titanium tetrachloride is added dropwise to the solution of 4,4,4-trichlorocrotonic acid. Thereafter, 48.5 grams of biphenyl are added and the solution is heated to a temperature of 60°–65° C. for about 19 hours.

After the reaction solution has been heated for about 19 hours, it is cooled and poured onto about 100 grams of ice and 10 ml. of hydrochloric acid. Thereafter, the resulting mixture is extracted with ether and the combined extracts are washed with water. The remaining ether is then further extracted with a solution of 2.4 grams of sodium hydroxide dissolved in 100 ml. of water. The aqueous solution is then acidified with concentrated hydrochloric acid after which the resulting crude acid is extracted with ether from which the residue product is recovered. The residue is weighed and found to yield 14.5 grams which upon recrystallization from acetonitrile is found to yield 8 grams of 4,4-dichloro-2-(4-biphenylyl)-3-butenoic acid having a M.P. of 168–1690° C. The recovered sample is found to have the following analysis:

Calculated: C, 62.56; H, 3.94; Cl, 23.08. Found: C, 62.48; H, 4.01; Cl, 22.92.

Example 2

A mixture of 48.5 grams of biphenyl, 10 grams (.053 mole) of 4,4,4-trichlorocrotonic acid and 3.5 grams of zinc dust is heated at 95° C. for about 1 hour and thereafter processed according to the procedure of Example 1. The desired product, 4,4-dichloro-2-(4-biphenylyl)-3-butenoic acid, is recovered according to the procedure of Example 1.

Example 3

A mixture of 48.5 grams of biphenyl, 50 ml. of nitrobenzene, 7 grams (.053 mole) of aluminum chloride and 10 grams (.053 mole) of 4,4,4-trichlorocrotonic acid are combined at 5° C. and heated to a temperature of about 60° C.–65° C. for about two and one-half hours. Thereafter, the procedure according to Example 1 is repeated and the desired 4,4-dichloro-2-(4-biphenyl)-3-butenoic acid is recovered.

Example 4

A mixture of 8.2 grams (.053 mole) of biphenyl, 10 grams (.053 mole) of 4,4,4-trichlorocrotonic acid and 1.8 grams (.027 mole) of zinc dust is heated at a temperature of 95° C. for 3 hours. The desired 4,4-dichloro-2-(4-biphenylyl)-3-butenoic acid is then recovered according to the procedure of Example 1.

Example 5

A mixture of 1.5 gram (.01 mole) of biphenyl, 1.9 grams (.01 mole) of 4,4,4-trichlorocrotonic acid and 0.16 gram (.001 mole) of anhydrous ferric chloride is heated upon a steam bath for ½ hour at a temperature of about 95° C. The product is recovered according to the procedure of Example 1 and is found to be 4,4-dichloro-2-(4-biphenylyl)-3-butenoic acid.

Example 6

A mixture of 1 gram (.00326 mole) of 4,4-dichloro-2-(4-biphenylyl)-3-butenoic acid, 0.1 gram of 10% palladium on charcoal, 0.13 gram (.00326 mole) of sodium hydroxide and 20 ml. of 80% methanol is subjected to a low pressure hydrogenation for a period of about 1 hour while at a temperature of about 25° C. Thereafter, the catalyst is removed and the solvent is concentrated to about one-fourth volume. 2-(4-biphenylyl) butyric acid which precipitates from the solvent is recovered by filtration, washed with water, and dried. The recovered acid precipitate is found to weigh 0.7 gram and is found to have a melting point of 126° C.–127° C. The recovery of acid is found to be about 90% of theoretical.

It is to be understood that the foregoing detailed description is given merely by way of illustration and that many variations may be made therein without departing from the spirit of this invention.

What is claimed is:
1. 4,4-dihalo-2-(4-biphenylyl)-3-butenoic acid.
2. 4,4-dichloro-2-(4-biphenylyl)-3-butenoic acid.

References Cited

A. Nesmeyanov et al., Condensation of . . . , in Chemical Abstracts, 8, 694, vol. 51, 1957.

Grebenyuk, A.D., and Tsukervanik, I. P. Zhur. Obshchei Khim., vol. 28, 2380–4 (1958).

LORRAINE A. WEINBERGER, *Primary Examiner.*

K. ROSE, M. WEBSTER, M. G. BERGER,
*Assistant Examiners.*